Sept. 30, 1958 J. K. MOSHER 2,854,022
VENT AND PILOT VALVE
Filed March 22, 1956 2 Sheets-Sheet 1
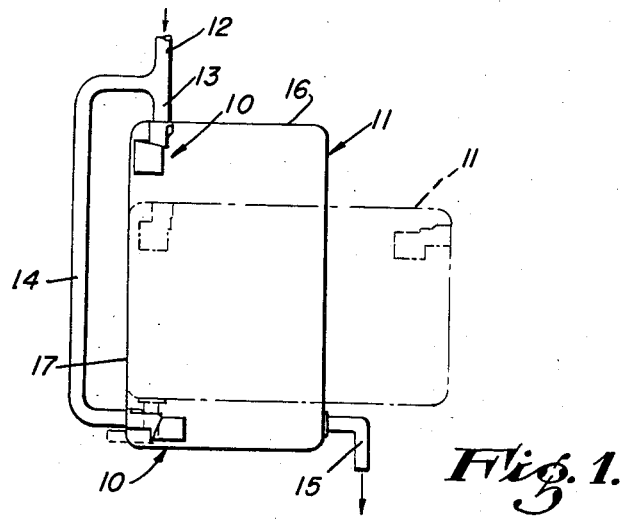
Fig. 1.
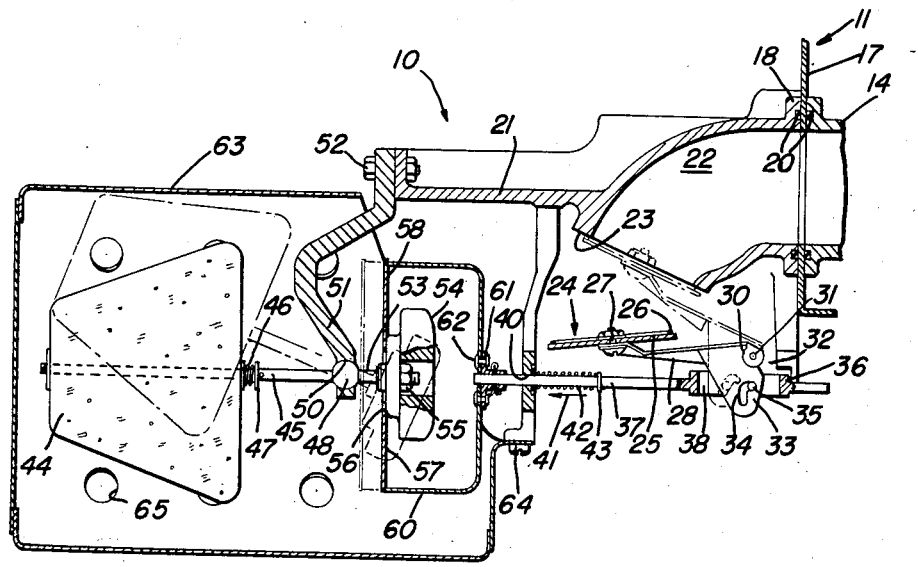
Fig. 2.
JAMES K. MOSHER,
INVENTOR.
BY 
Attorney Sept. 30, 1958     J. K. MOSHER     2,854,022
VENT AND PILOT VALVE
Filed March 22, 1956     2 Sheets-Sheet 2
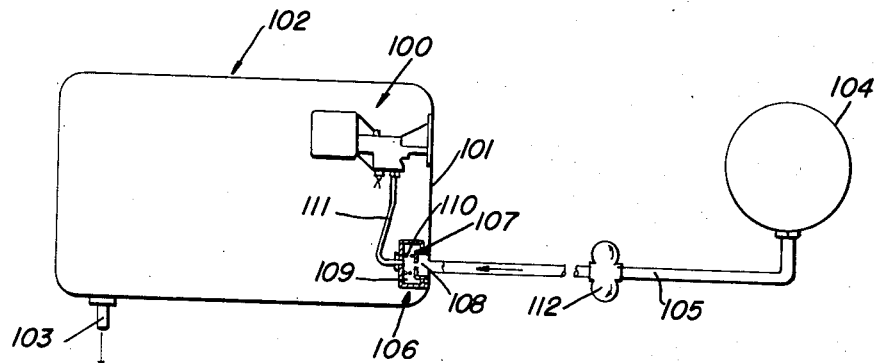
Fig. 3.
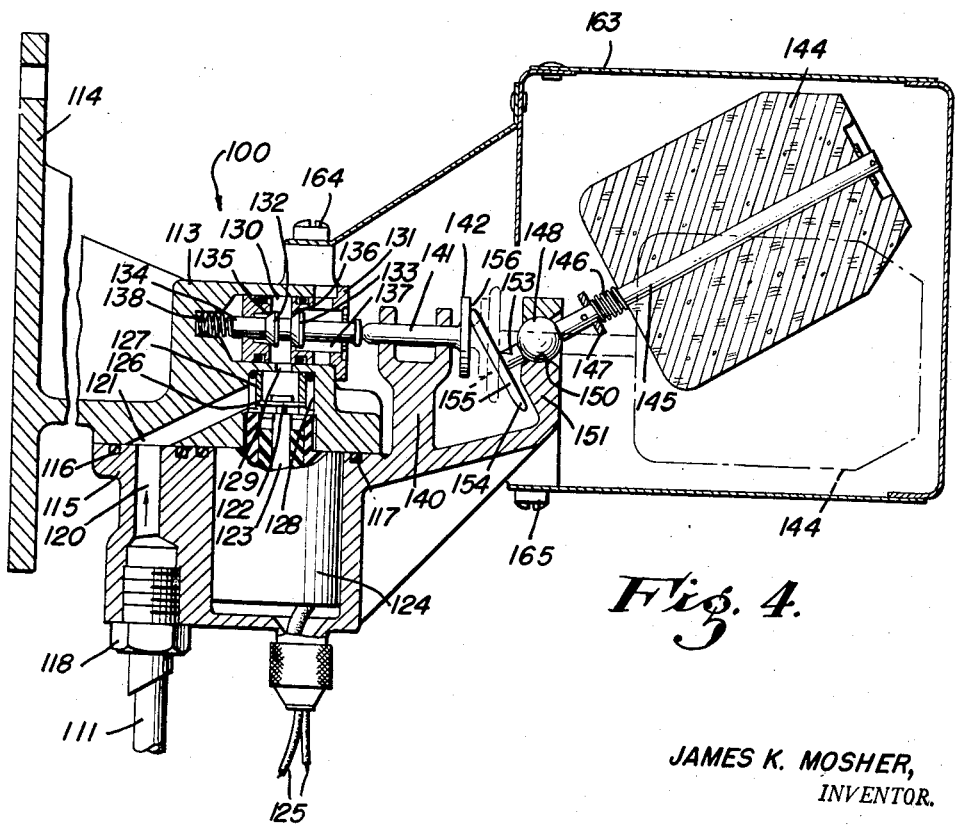
Fig. 4.
JAMES K. MOSHER,
INVENTOR.
BY 
Attorney United States Patent Office 2,854,022
Patented Sept. 30, 1958

2,854,022

VENT AND PILOT VALVE

James K. Mosher, Pasadena, Calif., assignor to Schulz Tool and Manufacturing Co., San Gabriel, Calif., a corporation of California Application March 22, 1956, Serial No. 573,191

18 Claims. (Cl. 137—413)

The present invention relates generally to fluid control valves and relates more specifically to such fluid control valves, including fluid operated float controlled operating means therefor, that are adapted for operation with the valve and control arrangements in various attitudes relative to the horizontal.

In fluid flow control valves and systems utilized, for example, in connection with the fuel system of an aircraft, when such valve arrangements are float controlled and operated, the operation of such valves is seriously hampered and/or prohibited in many cases, when the aircraft assumes an attitude other than the horizontal. With the advent of aircraft that may frequently assume a vertical position, valves of the present type must operate efficiently regardless of the position of the aircraft in controlling flow either to or from a fuel tank.

While the present invention will be shown and described in connection with an aircraft fuel tank and associated system, it is to be expressly understood that the valve arrangement disclosed herein is not to be limited for use with such a specific installation, but may be used for various other types of fluid flow control arrangements without departing from the spirit and scope of the claims herein.

It is accordingly an important object of the present invention to provide a novel fluid flow control valve.

It is another object of the present invention to provide a novel float supporting and operating mechanism for a fluid flow control valve.

It is a further object of the present invention to provide a novel mechanical means for operating a fluid flow control valve arrangement.

It is a still further object of the present invention to provide a novel fluid flow control valve for utilization in a fluid system wherein said valve is normally in an open position, and wherein novel float operated mechanism is employed for effecting closure of the valve.

It will be seen that the present invention has other important objects, advantages and features, some of which, with the foregoing, will be set forth in the following description in which certain embodiments of the invention have been selected for illustrative purposes only in the drawings, accompanying and forming a part of the present specification, and wherein:

Fig. 1 is a schematic view showing a typical installation of one of the valve arrangements of the present invention;

Fig. 2 is a transverse sectional view showing the detail of one form of the present invention;

Fig. 3 is a schematic view showing a further form of the present invention and utilization thereof in a fluid system; and Fig. 4 is a transverse sectional view on an enlarged scale showing the details of another form of valve arrangement for the present invention.

With reference to the drawings, and with reference primarily to Figs. 1 and 2 of the drawings, the valve arrangement of the present invention is shown as indicated generally at 10. As shown, the arrangement is adapted for use with a container such as an aircraft fuel tank 11. As shown, the tank 11 is fitted with a pair of valves 10, which are connected to a common inlet conduit 12, as by branch conduits 13 and 14. The tank 11 is also fitted with an outgo conduit 15 which may extend to a point of use for conducting the liquid from the tank to such point of use. It is to be noted that the valve arrangements 10 are mounted respectively adjacent one end 16 and one side 17 of the tank 11. In order that operation of the fluid inlet system through the conduits 12, 13 and 14 may be maintained regardless of the attitude of the tank 11 relative to a horizontal position.

As shown primarily in Fig. 2, the valve arrangement 10 is secured to one wall 17 of the tank 11 as by a flange 18 and suitable attachment means, not shown, there being sealing arrangements 20 disposed intermediate the flange 18 and the conduit 14 and the surfaces of the wall 17. The valve 10 includes a body 21 in which a passage 22 is formed and which communicates with the conduit 14. The inner end of the passage 22 defines a valve seat 23, against which a valve member indicated at 24 is adapted to act. The valve member 24 comprises a valve plate 25 having a sealing gasket 26 mounted thereon and secured thereto as by a central nut 27. The nut 27 also serves to connect the valve member with a bracket 28, which is in turn pivoted as at 30 on a pin 31. The pin 31 is also supported by a bracket 32 which extends outwardly from a portion of the body 21 of the valve 10.

The bracket 28 has downwardly disposed plate members 33 which cooperate with the bracket to provide a linkage between the valve member 24 and suitable operating mechanism to be hereinafter more fully described. The plates 33 are provided with L-shaped openings 34, which cooperate with a pin 35, which is in turn secured to an enlarged portion 36 of a rod 37. The plates 33 extend through a slot 38 in the enlarged portion 36, and the rod 37 is reciprocally mounted as at 40 in a portion of the body 21 of the valve member. The construction is such that upon reciprocal movement of the rod 37 in a direction indicated by the arrow 41, the pin 35 will be first moved out of one end of the slot 34 and will then act to move the plates 33 in a direction to move the plates 33, the bracket 28 and valve member 24 toward the dotted line position indicated in Fig. 2. A compression spring 42 disposed about the rod 37 and acting between the body 21 and a retaining ring 43, normally biasses the valve member 24 toward an open position as shown by the dotted lines in Fig. 2.

A float member 44, which may be made from cork or like material, is mounted on one end of the shaft 45 and resiliently positioned thereon as by a compression spring 46 acting intermediate the retaining ring 47 and one side of the float 44. A universal mounting for the shaft 45 is provided by means of a ball 48 secured to the central area of the shaft 45 and pivotally mounted in a socket 50, which is formed on an inner end of a bracket 51. The bracket 51 is secured to the body 21 as by suitable nuts and bolts 52. Another end of the shaft 45 extends beyond the ball 48 as at 53 and has an enlargement 54 mounted on the end thereof as by a suitable nut 55.

A surface 56 of the enlargement 54 is adapted to engage a surface 57 of a plate member 58, which is disposed radially outwardly and adjacent the surface 56 of the enlargement 54. The peripheral edge of the plate 58 is adapted to be engaged by a cage 60, which is in turn secured to the end of the rod 37 removed from the plates 33 as by a bracket 61 and rivets 62.

In operation, it is to be noted that when the float member 44 is moved in any direction radially outwardly from a neutral position as defined by the solid lines in Fig. 2, the enlargement 54 will co-act with the plate 58 to move the plate 58 axially as shown by the dotted lines thereby to move the rod 37 in the direction of the arrow 41 and effect closure of the valve member 24 as through the linkage hereinbefore described. In other words, as fuel is conducted to the tank 11 from the conduit 12 and branch conduits 13 and 14, the level within the tank 11 will be maintained regardless of the attitude of the tank relative to a horizontal position.

In order to prevent movement of the float member 44 when the liquid in the tank 11 may be splashed from one side to another, a housing or enclosure 63 partially surrounds the float member 44 and is secured to the body 21 of the valve as by a nut 64. The enclosure 63 may be provided with suitable openings 65 for the admittance of fluid thereto.

It is to be noted that the valve arrangements 10 may be mounted in various positions within the tank 11 with the inner end of the passage 22 communicating with the interior of the tank 11. While the valve members 10 have been shown as being disposed in two locations within the tank 11, it is to be understood that these valve arrangements may be located in any manner that may be required to effect proper control of the liquid level within the tank.

In Figs. 3 and 4, a modified arrangement of the present invention is shown wherein a single float valve arrangement is utilized. As shown schematically in Fig. 3, the valve arrangement is indicated at 100 and mounted on an end wall 101 of a suitable tank 102. The tank 102 is provided with an outlet 103 and is adapted to be supplied with liquid such as a fuel from a secondary tank 104, by way of a conduit 105. A float control valve indicated generally at 106 is provided with a valve member 107 having an orifice 108 therethrough and a chamber 109. The valve member 107 is urged toward a closed position as by a compression spring 110. The construction and operation of the valve member 106 is in accordance with the usual practice with such valves with a pressure existing in the chamber 109 by reason of the orifice 108 being bled down through a conduit 111. Fuel is forced toward the valve 106 as by a pump 112 from the tank 104. When the pressure in the chamber 109 is bled down, the lower pressure thus existing in this chamber will permit the valve to open, whereas, as the conduit 111 is closed, the pressure in the chamber 109 will increase and the spring 110 will move the valve member 107 toward a closed position.

In the form of the invention illustrated in Figs. 3 and 4, the invention resides in the valve arrangement together with the valve system and float control arrangement. As shown primarily in Fig. 4, the valve arrangement 100 comprises a housing 113 that may be secured to the side of the tank 102 as by a flange 114. A secondary housing 115 is positioned in contact with the housing 113 and is sealed with respect thereto as by sealing rings 116 and 117. The conduit 111 extends from the fluid flow control valve 106 to a fitting 118 which is threadably disposed in the housing portion 115 and communicates with a passage 120 formed in the housing 115. The passage 120 communicates with a second passage 121 in the housing 113, the passage 121 extending to an electromagnetically operated valve 122 which is secured on the end of an armature 123 of an electromagnet 124. Current for controlling the electromagnet 124 is delivered through suitable leads 125. The valve member 122 is adapted to cooperate with a valve seat 126 formed by an annular ring 127 which is seated in the bore 128. A second bore 129 communicates with lateral bores 130 formed in a housing 131 of a pilot valve arrangement. The pilot valve arrangement includes a pair of valve members 132 and 133 which are mounted on a shaft 134 which is in turn reciprocally positioned within the housing 131. The valve members 132 and 133 are adapted to cooperate with valve seats 135 and 136 respectively, which control communication between the radially extending ports 130 and the interior of the tank 102 as by a passage 137. The valve members 132 and 133 are biased toward an open position with respect to the valve seats 135 and 136 by means of a compression spring 138 which is disposed intermediate the housing 113 and one end of the shaft 134.

A guide member 140 disposed upwardly from the housing portion 115 is adapted to reciprocally support a pilot valve operating member 141 which is fitted with a plate 142 on one end thereof, the other end thereof being adapted for cooperation with the end of the shaft 134 remote from the compression spring 138. A float member 144 is mounted on one end of the shaft 145 and is retained thereon as by a compression spring 146, which is in turn held in place about the shaft 145 as by a ring 147. The shaft 145 is fitted with a ball 148 adjacent the central area thereof, the ball 148 being universally pivotally journalled in a socket 150 formed in an extension 151 of the housing portion 115. The inner end of the shaft 145 extends beyond the ball 148 as at 153, and has an end portion fitted with an enlargement 154. The enlargement 154 is adapted for cooperation with a plate 142, with a surface 155 of the enlargement 154 cooperating with the surface 156 of the plate 142. The compression spring 158 acting through the rod shaft 134 and the pilot valve operating member 141 serve to bias the shaft 145 and float member 144 toward a neutral position as indicated by the dotted lines in Fig. 4.

In a manner similar to that described in connection with the form of the invention shown in Fig. 2, a partially enclosing housing 163 is provided about the valve member 144 and secured to the housing 113 as by suitable screws 164 and 165. The housing 163 serves to prevent unwanted movement of liquid within the tank 102. In operation, and in order to energize the system, the electromagnetic valve 124 is energized, thus opening communication between the passage 121 and the lateral bores 130 of the pilot valve arrangement. The spring 138 serves to maintain the pilot valve in an open condition and serves to maintain the float member 144 in a neutral position as indicated by the dotted lines. When the liquid level rises to the level of the float 144, the float 144 will be raised or turned about the ball 148 in any radial direction relative to the neutral position of the float 144 and the shaft 145, thereby to cause the periphery of the enlargement 154 to contact the surface 156 of the plate 142, thereby to move the pilot valve operating member 141 in a direction to compress the spring 138 and close the pilot valve by seating the valve members 132 and 133 on their respective seats 135 and 136. In this manner, flow outwardly from the chamber 109 of the flow control valve 106 is stopped and, in the manner previously described, serves to terminate the flow of liquid from the conduit 105, past the valve member 107 and into the interior of the tank 102.

In the form of the invention shown in Figs. 3 and 4, it is to be noted that the tank 102 may be placed in various positions, either on its side or in the position shown in Fig. 3, and that the float 144 will still function in its movement about the universal float, created by the ball 148 and socket 150, to act to close the pilot valve member, thereby to close the flow control valve 106.

From the foregoing description, the uses, advantages, and operation of the present invention will be readily understood by those skilled in the art to which the invention appertains. While there has been described certain embodiments of the invention, it is desired to emphasize the fact that the invention may be applied to various types of valve mechanisms, to have it understood that the examples given are merely illustrative, and that the invention is not to be limited to the details disclosed herein but is to be accorded the full scope of the appended claims.

I claim:
1. In a fluid level responsive operating mechanism for a fluid flow control valve: a float member; supporting means for said float member; a universal pivot for said supporting means; means for normally urging said float member and said supporting means toward a neutral position, said universal pivot permitting movement of said float member in any radial direction relative to said neutral position; and means disposed intermediate said flow control valve and said supporting means for effecting movement of said valve toward a closed position in response to movement of said float member.

2. In a fluid level responsive operating mechanism for a fluid flow control valve: a float member; supporting means for said float member; a universal pivot for said supporting means; means for normally urging said float member and said supporting means toward a neutral position, said universal pivot permitting movement of said float member in any radial direction relative to said neutral position; and means disposed intermediate said flow control valve and an end of said supporting means remote from said float member for effecting movement of said valve toward a closed position in response to movement of said float member.

3. In a fluid level responsive operating mechanism for a fluid flow control valve: a float member; supporting means for said float member; a universal pivot for said supporting means; means for normally urging said float member and said supporting means toward a neutral position, said universal pivot permitting movement of said float member in any radial direction relative to said neutral position; and means disposed along the axis of said neutral position of said supporting means and intermediate said flow control valve and said supporting means for effecting movement of said valve toward a closed position in response to movement of said float member.

4. In a fluid level responsive operating mechanism for a fluid flow control valve: a float member; supporting means for said float member; a universal pivot for said supporting means; means for normally urging said float member and said supporting means toward a neutral position, said universal pivot permitting movement of said float member in any radial direction relative to said neutral position; and means disposed along the axis of said neutral position of said supporting means and intermediate said flow control valve and an end of said supporting means remote from said float member for effecting movement of said valve toward a closed position in response to movement of said float member.

5. In a fluid level responsive operating mechanism for a fluid flow control valve: a float member; supporting means for said float member; a universal pivot for said supporting means; means for normally urging said float member and said supporting means toward a neutral position, said universal pivot permitting movement of said float member in any radial direction relative to said neutral position; means disposed along the axis of said neutral position of said supporting means and intermediate said flow control valve and an end of said supporting means remote from said float member for effecting movement of said valve toward a closed position in response to movement of said float member; and enclosure means for dampening movement of said float member.

6. A fluid level responsive fluid flow control valve comprising: a valve member; means normally biasing said valve member toward an open position; means for effecting closing of said valve member; a float; a shaft, said float being mounted on one end of said shaft; a universal pivot for said shaft; means operatively associated with another end of said shaft remote from said float for actuating said means for effecting closing of said valve member; and spring means operative in connection with said last mentioned means for urging said shaft and said float toward a neutral position, said universal pivot permitting movement of said float in any radial direction relative to said neutral position.

7. A fluid level responsive fluid flow control valve comprising: a valve member; means normally biasing said valve member toward an open position; means for effecting closing of said valve member; a float; a shaft, said float being mounted on one end of said shaft; a universal pivot for said shaft; means operatively associated with another end of said shaft remote from said float and positioned on an axis of said shaft for actuating said means for effecting closing of said valve member; and spring means operative in connection with said last mentioned means for urging said shaft and said float toward a neutral position, said universal pivot permitting movement of said float in any radial direction relative to said neutral position.

8. In a fluid flow control valve: a normally open valve member; a float; a universally mounted shaft, said float being mounted on one end of said shaft; an enlargement on another end of said shaft; an operating mechanism for said valve member positioned for co-action with said enlargement; means normally urging said valve member toward an open position and urging said float and shaft toward said neutral position; and dampening means for movement of said float.

9. In a fluid flow control valve: a normally open valve member; a float; a universally mounted shaft, said float being mounted on one end of said shaft; an enlargement on another end of said shaft; an operating mechanism for said valve member arranged on a neutral axis of said shaft and positioned for co-action with said enlargement, said operating mechanism being adapted for axial movement in response to movement of said float and said enlargement about said universal mounting; means normally urging said valve member toward an open position and urging said float and shaft toward said neutral position; and dampening means for movement of said float.

10. A fluid flow control valve comprising, in combination: a valve member; spring means normally biasing said valve member toward an open position; linkage means operatively associated with said spring means; a rod connected to said linkage means and extending therefrom; means for reciprocally supporting said rod; a plate secured on one end of said rod remote from said linkage means; a float; a shaft, said float being mounted on one end of said shaft; a universal mounting for said shaft; and an enlargement disposed on another end of said shaft, said enlargement being adapted for surface contact with said plate whereby to bias said float and said shaft toward a neutral position, said float being adapted for movement in any radial direction relative to said neutral position thereby to permit contact of said enlargement with said plate and axial movement of said rod to close said valve member through said linkage means.

11. A fluid flow control valve comprising, in combination: a valve member; spring means normally biasing said valve member toward an open position; linkage means operatively associated with said spring means; a rod connected to said linkage means and extending therefrom; means for reciprocally supporting said rod; a plate secured on one end of said rod remote from said linkage means; a float; a shaft, said float being mounted on one end of said shaft; an enlargement disposed on another end of said shaft, said enlargement being adapted for surface contact with said plate whereby to bias said float and said shaft toward a neutral position, said float being adapted for movement in any radial direction relative to said neutral position whereby to permit peripheral contact of said enlargement with said plate and axial movement of said rod to close said valve member through said linkage means; and a partial enclosure about said float for dampening movement of said float.

12. A fluid flow control valve comprising, in combination: a pivoted valve member; spring means normally biasing said valve member toward an open position; linkage means operatively associated with said spring means; a rod connected to said linkage means, disposed within said spring means and extending therefrom; means for reciprocally supporting said rod; a cage secured on one end of said rod remote from said linkage means; a plate mounted on one end of said cage; a float; a shaft, said float being mounted on one end of said shaft; a fixed position universal mounting for said shaft; an enlargement disposed on another end of said shaft, said enlargement being adapted for surface contact with said plate whereby to bias said float and said shaft toward a neutral position, said float being adapted for movement in any radial direction relative to said neutral position thereby to permit peripheral contact of said enlargement with said plate and axial movement of said rod to close said valve member through said linkage means; and a partial enclosure about said float for dampening movement of said float.

13. A fluid flow control system comprising, in combination: a fluid operated flow control valve; a pilot valve for controlling flow of control fluid from said control valve; conduit means connecting said pilot valve with said control valve; spring means normally biasing said pilot valve toward on open position whereby to permit said control valve to remain in an open position; a float; a shaft, said float being mounted on one end of said shaft; a fixed position universal mounting for said shaft; an enlargement disposed on another end of said shaft; a pilot valve operating member; and a plate formed on one end of said operating member remote from said pilot valve, a surface of said enlargement being normally adapted to engage a surface of said plate thereby normally to bias said float and said shaft toward a neutral position, said float being adapted for movement in any radial direction relative to said neutral position thereby to permit peripheral contact of said enlargement with said plate and axial movement of said pilot valve operating member to close said pilot valve and to close said flow control valve, such action being in response to the presence of liquid about said float and movement of said float thereby.

14. A fluid flow control system comprising, in combination: a fluid operated flow control valve; a pilot valve for controlling flow of control fluid from said control valve; control means connecting said pilot valve with said control valve; spring means normally biasing said pilot valve toward an open position whereby to permit said control valve to remain in an open position; a float; a shaft, said float being mounted on one end of said shaft; a fixed position universal mounting for said shaft; an enlargement disposed on another end of said shaft; a pilot valve operating member; a plate formed on one end of said operating member remote from said pilot valve, a surface of said enlargement being normally adapted to engage a surface of said plate thereby normally to bias said float and said shaft toward a neutral position, said float being adapted for movement in any radial direction relative to said neutral position thereby to permit peripheral contact of said enlargement with said plate and axial movement of said pilot valve operating member to close said pilot valve and to close said flow control valve, such action being in response to the presence of liquid about said float and movement of said float thereby; and a partial enclosure about said float for dampening movement of said float.

15. A fluid flow control system comprising, in combination: a fluid operated flow control valve; a pilot valve for controlling flow of control fluid from said control valve; conduit means connecting said pilot valve with said control valve; spring means normally biasing said pilot valve toward an open position whereby to permit said control valve to remain in an open position; a float; a shaft, said float being mounted on one end of said shaft; a fixed position universal mounting for said shaft; an enlargement disposed on another end of said shaft; a pilot valve operating member; a plate formed on one end of said operating member remote from said pilot valve, a surface of said enlargement being normally adapted to engage a surface of said plate thereby normally to bias said float and said shaft toward a neutral position, said float being adapted for movement in any radial direction relative to said neutral position thereby to permit peripheral contact of said enlargement with said plate and axial movement of said pilot valve operating member to close said pilot valve and to close said flow control valve, such action being in response to the presence of liquid about said float and movement of said float thereby; and electrically operated means for closing communication between said pilot valve and said control valve through said conduit means.

16. A fluid flow control system comprising, in combination: a fluid operated flow control valve; a pilot valve for controlling flow of control fluid from said control valve; conduit means connecting said pilot valve with said control valve; spring means normally biasing said pilot valve toward an open position whereby to permit said control valve to remain in an open position; a float; a shaft, said float being mounted on one end of said shaft; a fluid position universal mounting for said shaft; an enlargement disposed on another end of said shaft; a pilot valve operating member; a plate formed on one end of said operating member remote from said pilot valve, a surface of said enlargement being normally adapted to engage a surface of said plate thereby normally to bias said float and said shaft toward a neutral position, said float being adapted for movement in any radial direction relative to said neutral position thereby to permit peripheral contact of said enlargement with said plate and axial movement of said pilot valve operating member to close said pilot valve and to close said flow control valve, such action being in response to the presence of liquid about said float and movement of said float thereby; a partial enclosure about said float for dampening movement of said float; and electrically operated means for closing communication between said pilot valve and said control valve through said conduit means.

17. In a liquid level responsive mechanism, in combination: a float member, said member having a stem; means associated with the stem providing a universal mounting for the float member; control means actuated by the float member responsive to universal movement thereof; and means providing inter-engagement between the actuated means and the stem comprising mutually engageable members so formed that upon movement of the float member in any direction a predetermined control action is imparted to the said actuated means.

18. The structure of claim 17 wherein said means providing inter-engagement between the actuated means and the stem comprises a circular member and another member having a flat surface and movable in a direction normal to the surface whereby upon movement of the float member in any direction a corresponding movement in a single direction is imparted to said other member by the said circular member.

References Cited in the file of this patent

UNITED STATES PATENTS

| | | |
|---|---|---|
| 362,963 | Hopper | May 17, 1887 |
| 2,137,880 | Loesser | Nov. 22, 1938 |
| 2,642,747 | Le Van | June 23, 1953 |
| 2,646,067 | Smith | July 21, 1953 |
| 2,684,077 | Shaffer | July 20, 1954 |
| 2,698,631 | Bashark | Jan. 4, 1955 |